US008233537B2

(12) United States Patent
Mittal et al.

(10) Patent No.: US 8,233,537 B2
(45) Date of Patent: Jul. 31, 2012

(54) EFFICIENT IMPLEMENTATION OF H.264 4 BY 4 INTRA PREDICTION ON A VLIW PROCESSOR

(75) Inventors: Sunand Mittal, Uttar Pradesh (IN); Ratna M. V. Reddy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1478 days.

(21) Appl. No.: 11/687,926

(22) Filed: Mar. 19, 2007

(65) Prior Publication Data

US 2008/0232471 A1    Sep. 25, 2008

(51) Int. Cl.
*G06F 21/00*    (2006.01)
(52) U.S. Cl. ............... 375/240.12; 375/240; 382/234; 380/217; 380/269; 370/342; 713/163; 708/313
(58) Field of Classification Search ............ 375/240, 375/240.13
See application file for complete search history.

(56) References Cited

U.S. PATENT DOCUMENTS

| | | | |
|---|---|---|---|
| 7,953,152 B1 * | 5/2011 | Ameres et al. ......... 375/240.16 |
| 2003/0179826 A1 | 9/2003 | Jeon | |
| 2005/0058356 A1 | 3/2005 | Shen et al. | |
| 2005/0117640 A1 * | 6/2005 | Han ................. 375/240.03 |
| 2005/0117653 A1 * | 6/2005 | Sankaran ............... 375/240.24 |
| 2006/0109911 A1 * | 5/2006 | Jang et al. ............. 375/240.18 |
| 2006/0126730 A1 * | 6/2006 | Arakawa et al. ........ 375/240.03 |
| 2006/0146939 A1 * | 7/2006 | Wang ..................... 375/240.24 |
| 2006/0176962 A1 * | 8/2006 | Arimura et al. ......... 375/240.24 |
| 2006/0215763 A1 * | 9/2006 | Morimoto et al. ....... 375/240.18 |
| 2006/0222066 A1 * | 10/2006 | Yoo et al. ............... 375/240.03 |
| 2007/0183506 A1 * | 8/2007 | Chujoh et al. ........... 375/240.23 |
| 2008/0049837 A1 * | 2/2008 | Tanaka et al. ........... 375/240.16 |
| 2008/0056347 A1 * | 3/2008 | Chiu et al. .................. 375/240 |
| 2008/0123974 A1 * | 5/2008 | Zhu ............................ 382/234 |

OTHER PUBLICATIONS

Au et al., "Efficient intra-prediction mode selection for 4×4 blocks in H.264", Multimedia and Expo, 2003. ICME '03. Proceedings. 2003 International Conference on, Jul. 6-9, 2003, vol. 3, pp. III-521-III-524.*

* cited by examiner

*Primary Examiner* — Taghi Arani
*Assistant Examiner* — Morshed Mehedi
(74) *Attorney, Agent, or Firm* — Robert D. Marshall, Jr.; Wade James Brady, III; Frederick J. Telecky, Jr.

(57) ABSTRACT

This invention is useful in video compression standards support a rich set of intra prediction modes. This invention a unique table creation and lookup approach to software pipeline the prediction process for all pixels within a block. The table stores constant data and pointer data into a neighbor pixel table. Indexing into the table based upon the current intra prediction mode for each pixel of a block recalls constant data and other pixel data for calculation of an intra prediction value.

12 Claims, 6 Drawing Sheets

(1) = L1I CACHE MISS FILL FROM L2
(2) = L1D CACHE MISS FILL FROM L2
(3) = L1D WRITE MISS TO L2, OR L1D VICTIM TO L2, OR L1D SNOOP RESPONSE TO L2
(4) = L2 CACHE MISS FILL, OR DMA INTO L2
(5) = L2 VICTIM WRITE BACK, OR DMA OUT OF L2
(6) = DMA INTO L2
(7) = DMA OUT OF L2

EFFICIENT IMPLEMENTATION OF H.264 4 BY 4 INTRA PREDICTION ON A VLIW PROCESSOR

TECHNICAL FIELD OF THE INVENTION

The technical field of this invention is video data compression.

BACKGROUND OF THE INVENTION

The H.264 video coding standard jointly developed by ITUT and MPEG provides the state-of-the-art video coding techniques to achieve high coding efficiency. It includes an enhanced Intra-prediction technique. Intra-prediction exploits spatial redundancy in picture. A macroblock or block is predicted from earlier decoded adjacent pixels. The H.264 standard supports a rich set of prediction patterns for intra-prediction. These include nine prediction modes for 4 by 4 luminance blocks and four prediction modes for 16 by 16 blocks. This increased number of intra-prediction modes increases decoding complexity. The decoding modes for 4 by 4 blocks involves many conditional branch statements for prediction mode selection within a macroblock. This is not suitable for very long instruction word (VLIW) processors, which perform best on parallel code without conditional branches.

Figure 1:
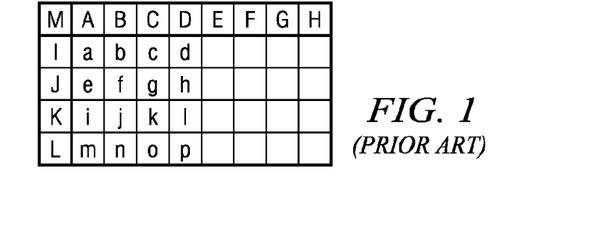
FIG. 1 illustrates the nomenclature used for description of 4 by 4 intra prediction (prior art)

FIG. 1 illustrates the nomenclature used for description of 4 by 4 intra prediction. The pixels labeled a to p are the 4 by 4 blocks to be predicted. The pixels labeled A to D are neighbor pixels of a top block and pixels E to H are top right neighbor pixels. Pixels I to L pixels are left neighbors. Pixel M is the top left corner neighbor. Some or all of these neighbor pixels may not available for a given 4 by 4 block depending upon its position in the frame. Each pixel can take a value 0 to 255 and is represented by an 8-bit data word.

Figure 2:
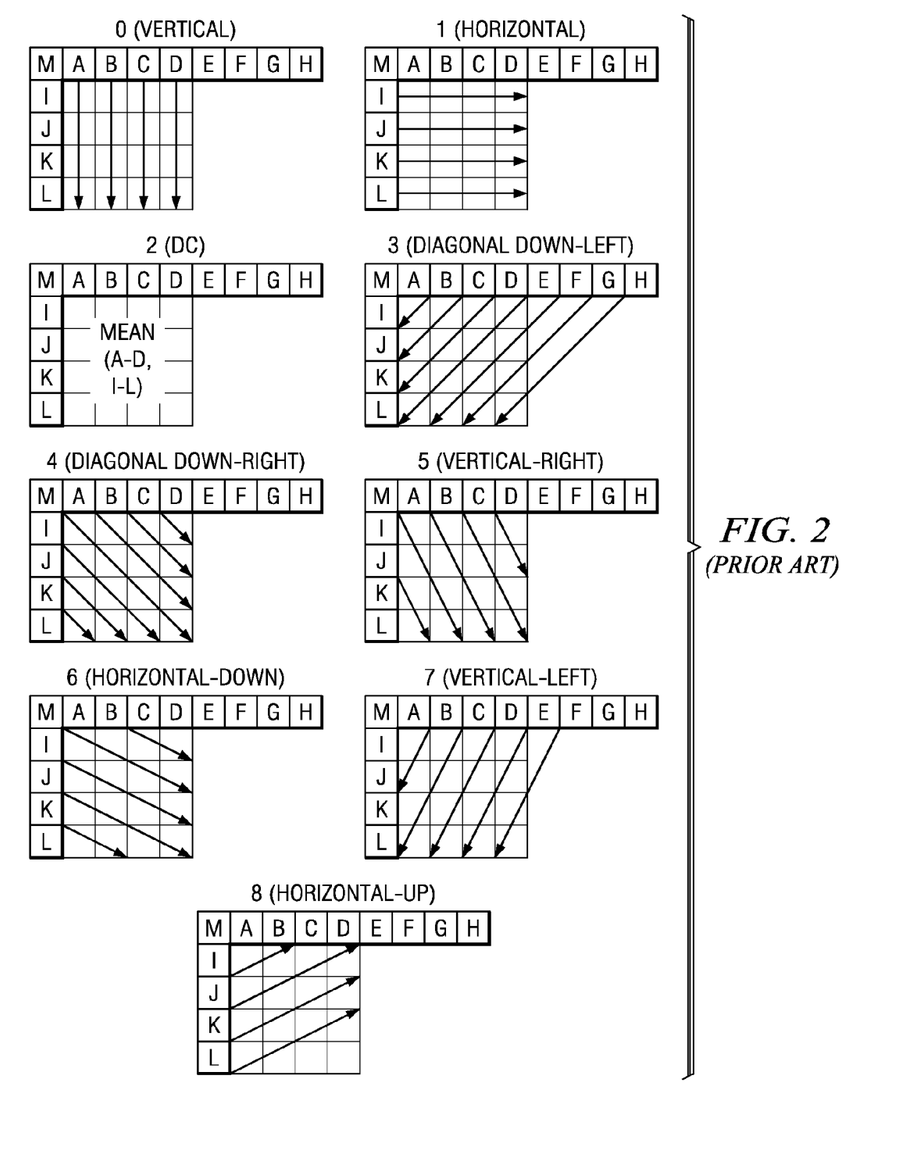
FIG. 2 schematically illustrates the 9 prediction modes for 4 by 4 blocks (prior art)

FIG. 2 schematically illustrates the 9 prediction modes for 4 by 4 blocks. The arrows represent the direction of prediction for each mode to create a prediction buffer pred[16]. Modes 0 and 1 are respective vertical and horizontal modes, in which top and left pixels are extrapolated. Mode 2 is a DC mode in which an average of available pixels from the top and left neighbor pixels is taken. In modes 3 to 8, predicted pixels are formed by weighted average of neighbor pixels. For instance, pixel a for prediction mode 4 (diagonal down-right) is created by rounded value of (I/4+M/2+A/4). A prediction mode is selected during encoding only if all required neighbor pixels are available. As a special case, if top right neighbor pixels E to H are not available, the neighbor pixel D is replicated in pixels E to H for the purpose of prediction.

Figure 3:
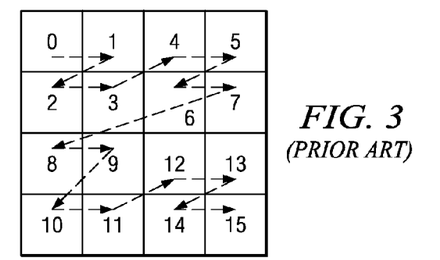
FIG. 3 illustrates the predetermined scanning order according to the video coding standard (prior art)

The encoder can may use a 4 by 4 intra prediction mode at 16 by 16 macroblock (MB) level. There are sixteen 4 by 4 luminance sub-blocks in a 16 pixel by 16 pixel macroblock. FIG. 3 illustrates the predetermined scanning order according to the standard. The encoding mechanism for 4 by 4 luminance prediction involves following steps. The macroblock is scanned in the order and for each 4 by 4 block a best prediction mode 0 to 8 is selected. A prediction buffer is created according to the selected prediction mode. The intra predicted 4 by 4 block is subtracted from 4 by 4 block to be encoded. The residual error data is encoded. The information of the selected prediction mode for the 16 4 by 4 blocks is encoded separately.

Decoding a macroblock encoded with 4 by 4 intra prediction is as follows. The macroblock is scanned in order illustrated in FIG. 3. The decoder reads the separately encoded prediction mode and determines the availability of neighbor pixels. The decoder reads the neighbor pixels specified by predictions mode and creates a prediction buffer pred[16]. The decoder separately decodes the residual error data, which are signed 16 bit values. The decoder adds the prediction buffer pixel to residual error data of the current pixel to obtain the reconstructed pixels. After this addition, the decoder saturates the reconstructed pixels to 8-bit values. The decoder writes the reconstructed pixel values into an output buffer. Some of these reconstructed pixels may act as neighbor pixels for following 4 by 4 blocks.

Table 1 shows the interface of the 4 by 4 intra prediction decoder function just described.

TABLE 1

| Argument | Description |
| --- | --- |
| pred_ptr[16] | Array of prediction modes for 16 4 by 4 blocks. The values are the 9 enumerated prediction modes. |
| top_pixels[20] | Array of top and top right neighbor pixels. This array contains 20 pixels as neighbors of top 4 blocks of the MB. |
| left_pixels[16] | Array of left neighbor pixels. This array contains 16 pixels as neighbors of 4 left blocks of the MB. |
| corner_pixels[4] | Array of top left corner pixels. This array contains 4 pixels for 4 left blocks (0, 2, 8, 10) of the MB |
| left_availbp | Bit pattern for availability information for left neighbors I to L. This is a 16 bit value; one bit per 4 by 4 block indicating whether the neighbor is available. |
| top_availbp | Bit pattern for availability information for top neighbors A to D. This is a 16 bit value; one bit per 4 by 4 block indicating whether the neighbor is available. |
| topright_availbp | Bit pattern for availability information for top right neighbors E to H. This is a 16 bit value; one bit per 4 by 4 block indicating whether the neighbor is available. |
| in_ptr | Pointer to input residual error data. |
| out_ptr | Pointer to output reconstruction buffer. |
| zigzag_tbl | Lookup table for pointer movement across 4 by 4 blocks within the MB as illustrated in FIG. 3. |

The top_pixels, left_pixels and corner_pixels arrays contain the neighbor pixels of the current macroblock. If any neighbor pixel is not available, the array entry has a value of 128. The values in these arrays are updated while processing 4 by 4 blocks which are the neighbor pixels for subsequent blocks. For example: the reconstructed pixels d, h, l and p of block 0 are left neighbor pixels I, J, K and L for block 1; the reconstructed pixels m, n, o and p of block 0 are top neighbor pixels A, B, C and D for block 2; the reconstructed pixel p of block 0 is the top left corner neighbor M for block 3; and the reconstructed pixels m, n, o and p of block 1 are top right pixels E, F, G and H for block 2.

The DC prediction value in the DC mode is calculated as follows. If top and left neighbor pixels are available, then:

$$dc=(A+B+C+D+I+J+K+L+4)/8 \qquad (1).$$

If only top neighbor pixels are available, then:

$$dc=(A+B+C+D+2)/4 \qquad (2).$$

If only left neighbor pixels are available, then:

$$dc=(I+J+K+L+2)/4 \qquad (3).$$

If no neighboring pixels are available, then:

$$dc=128 \quad (4).$$

Note that because unavailable neighboring pixels in the pixels arrays have a value of 128, the DC calculations are identical for the first and last cases above.

The neighbor, prediction and reconstructed pixels are all 8-bit unsigned values from 0 to 255. The residual error data is a 16 bit signed value. Addition between prediction buffer and residual error involves bit shifting and saturation in the standard.

A typical implementation of the 4 by 4 intra prediction function on a VLIW processor such as the Texas Instruments TMS3206400 would include the following optimization techniques. This typical implementation would use packed storage data placing four 8-bit values in 32 bit registers. This typical implementation would use of single instruction multiple data (SIMD) instructions such as DOTPU4 which calculates the dot product of four 8-bit values for efficient prediction values. This typical implementation would use registers instead of read/write memory for the prediction buffer.

Generally maximum utilization of a VLIW processor uses software-pipelining of a loop to achieve parallelism and maximum utilization of processing units of the processor. Software-pipelining is feasible only when loop does not have conditional branch statements. Software pipelining of intra prediction function of the prior art even using above optimizations is not feasible. This is because there are conditional branching based upon selection from the 9 prediction modes. Thus the prior art techniques under utilize a VLIW processor.

SUMMARY OF THE INVENTION

This invention is an efficient software-pipelined technique for luminance intra prediction of 4 by 4 blocks. The technique is described in connection with a decoder but is extensible and also applicable for encoding. This invention may be implemented on a Texas Instruments TMS320C6400 digital signal processor providing 30 to 40% improvement over the prior art H.264 decoder.

This invention uses a table creation and lookup technique that eliminates branching for the different prediction modes within a macroblock. The function is software pipelined for each macroblock for maximum utilization of VLIW architecture. The technique uses a static prediction table, which contains information on the nine prediction modes. For a given 4 by 4 block, a neighbor table containing neighbor pixels packed in a unique form is created. The constants from the prediction table indexed using prediction mode are multiplied with neighbor table entries to create a prediction values without any branching.

BRIEF DESCRIPTION OF THE DRAWINGS

These and other aspects of this invention are illustrated in the drawings, in which.

DETAILED DESCRIPTION OF PREFERRED EMBODIMENTS

Figure 4:
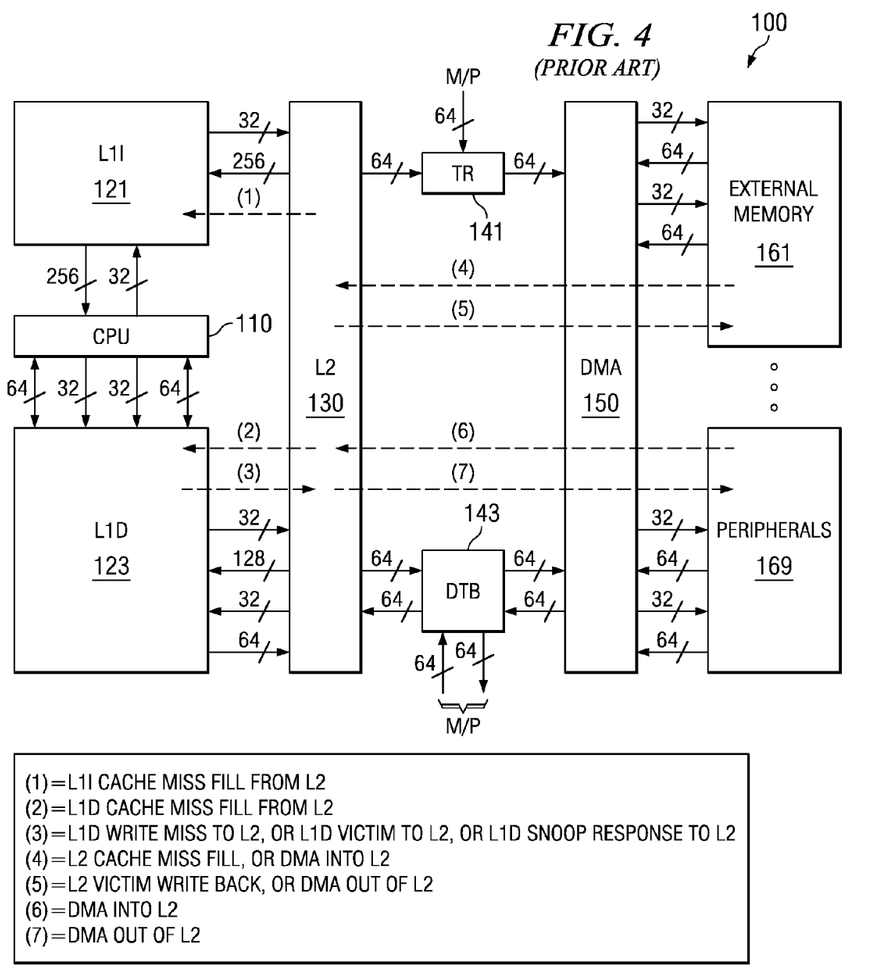
FIG. 4 illustrates the organization of a typical digital signal processor to which this invention is applicable (prior art)

FIG. 4 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 5 to 7.

Digital signal processor system 100 includes a number of cache memories. FIG. 4 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 5:
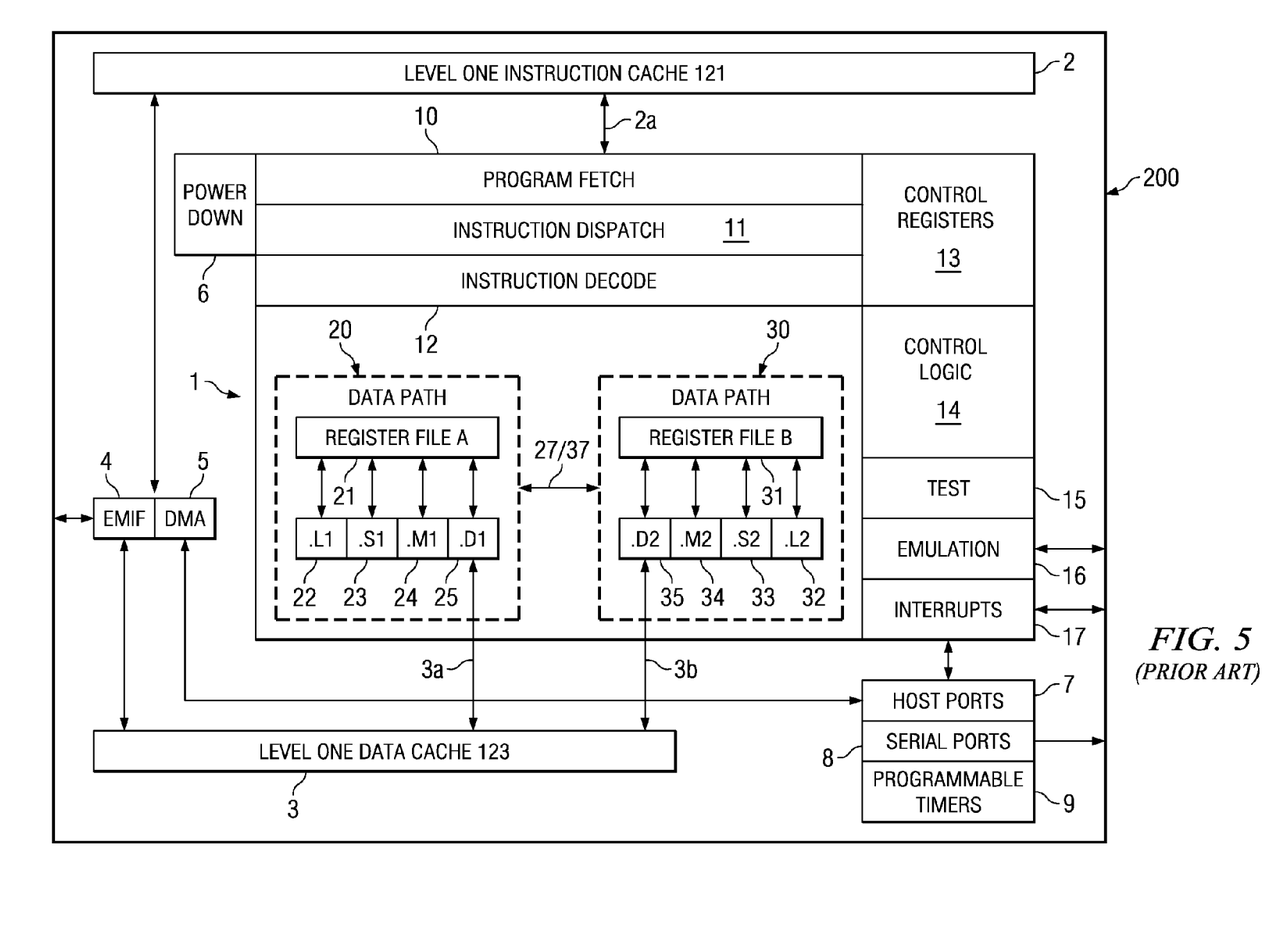
FIG. 5 illustrates details of a very long instruction word digital signal processor core suitable for use in FIG. 4 (prior art)

FIG. 5 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 6:
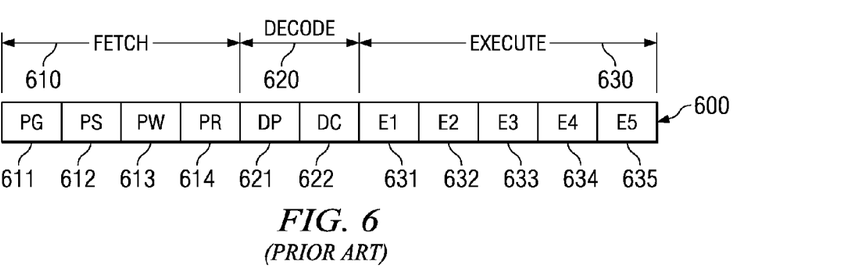
FIG. 6 illustrates the pipeline stages of the very long instruction word digital signal processor core illustrated in FIG. 5 (prior art)

FIG. 6 illustrates the pipeline stages 600 of digital signal processor core 110 (prior art). These pipeline stages are divided into three groups: fetch group 610; decode group 620; and execute group 630. All instructions in the instruction set flow through the fetch, decode, and execute stages of the pipeline. Fetch group 610 has four phases for all instructions, and decode group 620 has two phases for all instructions. Execute group 630 requires a varying number of phases depending on the type of instruction.

The fetch phases of the fetch group 610 are: Program address generate phase 611 (PG); Program address send phase 612 (PS); Program access ready wait stage 613 (PW); and Program fetch packet receive stage 614 (PR). Digital signal processor core 110 uses a fetch packet (FP) of eight instructions. All eight of the instructions proceed through fetch group 610 together. During PG phase 611, the program address is generated in program fetch unit 10. During PS phase 612, this program address is sent to memory. During PW phase 613, the memory read occurs. Finally during PR phase 614, the fetch packet is received at CPU 1.

The decode phases of decode group 620 are: Instruction dispatch (DP) 621; and Instruction decode (DC) 622. During the DP phase 621, the fetch packets are split into execute packets. Execute packets consist of one or more instructions which are coded to execute in parallel. During DP phase 622, the instructions in an execute packet are assigned to the appropriate functional units. Also during DC phase 622, the source registers, destination registers and associated paths are decoded for the execution of the instructions in the respective functional units.

The execute phases of the execute group 630 are: Execute 1 (E2) 631; Execute 2 (E2) 632; Execute 3 (E3) 633; Execute 4 (E4) 634; and Execute 5 (E5) 635. Different types of instructions require different numbers of these phases to complete. These phases of the pipeline play an important role in understanding the device state at CPU cycle boundaries.

During E1 phase 631, the conditions for the instructions are evaluated and operands are read for all instruction types. For load and store instructions, address generation is performed and address modifications are written to a register file. For branch instructions, branch fetch packet in PG phase 611 is affected. For all single-cycle instructions, the results are written to a register file. All single-cycle instructions complete during the E1 phase 631.

During the E2 phase 632, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 622.

During E3 phase 633, data memory accesses are performed. Any multiply instruction that saturates results sets the SAT bit in the control status register (CSR) if saturation occurs. Store instructions complete during the E3 phase 633.

During E4 phase 634, for load instructions, data is brought to the CPU boundary. For multiply extensions instructions, the results are written to a register file. Multiply extension instructions complete during the E4 phase 634.

During E5 phase 635, load instructions write data into a register. Load instructions complete during the E5 phase 635.

Figure 7:
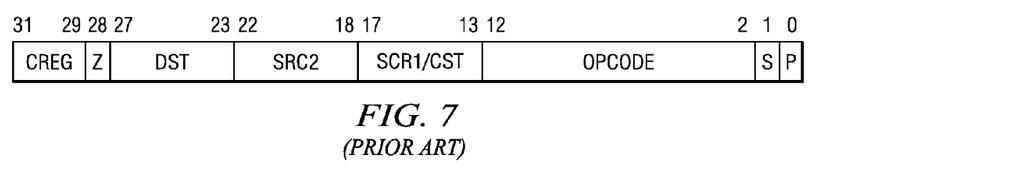
FIG. 7 illustrates the instruction syntax of the very long instruction word digital signal processor core illustrated in FIG. 5 (prior art)

FIG. 7 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg =0 and z=0 is treated as always true to allow unconditional instruction execution. The creg field is encoded in the instruction opcode as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 8:
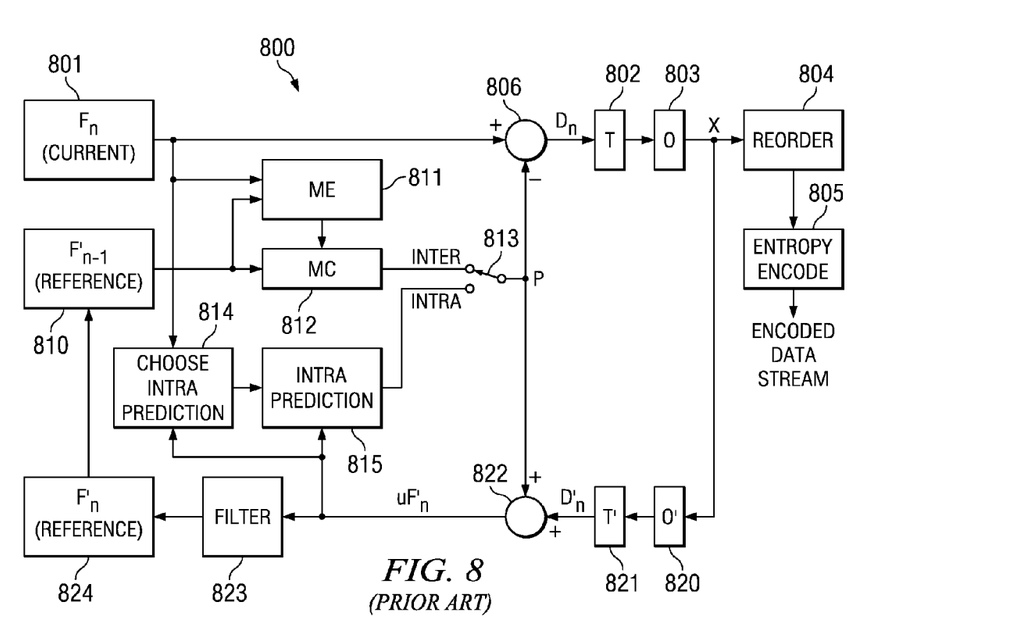
FIG. 8 illustrates an overview of the video encoding process of the prior art.

FIG. 8 illustrates the encoding process 800 of video encoding according to the prior art. Many video encoding standards use similar processes such as represented in FIG. 8. Encoding process 800 begins with the n th frame $F_n$ 801. Frequency transform block 802 transforms a macroblock of the pixel data into the spatial frequency domain. This typically involves a discrete cosine transform (DCT). This frequency domain data is quantized in quantization block 803. This quantization typically takes into account the range of data values for the current macroblock. Thus differing macroblocks may have differing quantizations. In accordance with the H.264 standard, in the base profile the macroblock data may be arbitrarily reordered via reorder block 804. As will be explained below, this reordering is reversed upon decoding. Other video encoding standards and the H.264 main profile transmit data for the macroblocks in strict raster scan order. The quantized data is encoded by entropy encoding block 805. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 810 and data from the current frame $F_n$ 801 supply motion estimation block 811. Motion estimation block 811 determines the positions and motion vectors of moving objects within the picture. This motion data is supplied to motion compensation block 812 along with data from frame $F_{n-1}$ 810. The resulting motion compensated frame data is selected by switch 813 for application to subtraction unit 806. Subtraction unit 806 subtracts the inter prediction data from switch 813 from the input frame data from current frame $F_n$ 801. Thus frequency transform block 802, quantization block 803, reorder block 804 and entropy encoding block 805 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 811 and motion compensation block 812 find no moving objects to code. If the current frame $F_n$ and the prior frame $F_{n-1}$ are identical, the subtraction unit 806 will produce a string of zeros for data. This data string can be encoded using few bits.

The second type of prediction is intra prediction. Intra prediction predicts a macroblock of the current frame from another macroblock of that frame. Inverse quantization block 820 receives the quantized data from quantization block 803 and substantially recovers the original frequency domain data. Inverse frequency transform block 821 transforms the frequency domain data from inverse quantization block 820 back to the spatial domain. This spatial domain data supplies one input of addition unit 822, whose function will be further described. Encoding process 800 includes choose intra predication unit 814 to determine whether to implement intra prediction. Choose intra prediction unit 814 receives data from current frame $F_n$ 801 and the output of addition unit 822. Choose intra prediction unit 814 signals intra prediction intra predication unit 815, which also receives the output of addition unit 822. Switch 813 selects the intra prediction output for application to the subtraction input of subtraction units 806 and an addition input of addition unit 822. Intra prediction is based upon the recovered data from inverse quantization block 820 and inverse frequency transform block 821 in order to better match the processing at decoding. If the encoding used the original frame, there might be drift between these processes resulting in growing errors.

Video encoders typically periodically transmit unpredicted frames. In such an event the predicted frame is all 0's. Subtraction unit 806 thus produces data corresponding to the current frame $F_n$ 801 data. Periodic unpredicted or I frames limits any drift between the transmitter coding and the receive decoding. In video such a movies a scene change may produce such a large change between adjacent frames that differential coding provides little advantage. Video coding standards typically signal whether a frame is a predicted frame and the type of prediction in the transmitted data stream.

Encoding process 800 includes reconstruction of the frame based upon this recovered data. The output of addition unit 822 supplies deblock filter 823. Deblock filter 823 smoothes artifacts created by the block and macroblock nature of the encoding process. The result is reconstructed frame $F'_n$ 824. As shown schematically in FIG. 8, this reconstructed frame $F'_n$ 824 becomes the next reference frame $F_{n-1}$ 810.

Figure 9:
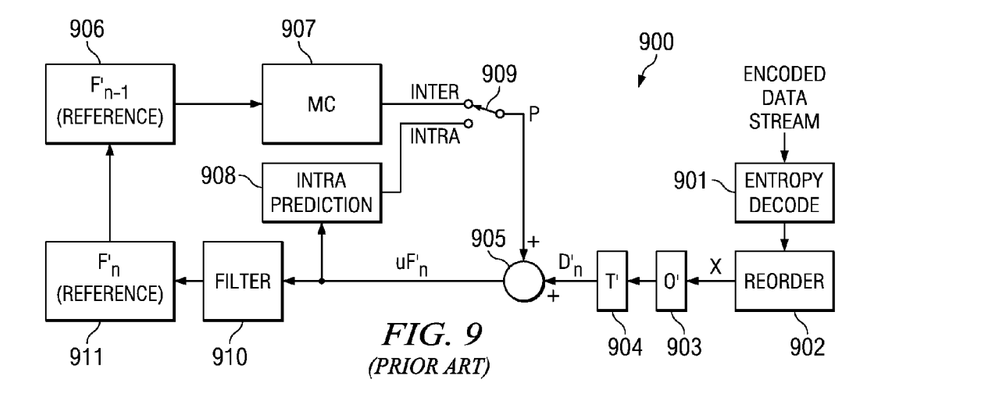
FIG. 9 illustrates an overview of the video decoding process of the prior art.

FIG. 9 illustrates the corresponding decoding process 900. Entropy decode unit 901 receives the encoded data stream. Entropy decode unit 901 recovers the symbols from the entropy encoding of entropy encoding unit 805. Reorder unit 902 assembles the macroblocks in raster scan order reversing the reordering of reorder unit 804. Inverse quantization block 903 receives the quantized data from reorder unit 902 and substantially recovers the original frequency domain data. Inverse frequency transform block 904 transforms the frequency domain data from inverse quantization block 903 back to the spatial domain. This spatial domain data supplies one input of addition unit 905. The other input of addition input 905 comes from switch 909. In inter mode switch 909 selects the output of motion compensation unit 907. Motion compensation unit 907 receives the reference frame $F'_{n-1}$ 906 and applies the motion compensation computed by motion compensation unit 812 and transmitted in the encoded data stream.

Switch 909 may also select intra prediction. The intra prediction is signaled in the encoded data stream. If this is selected, intra prediction unit 908 forms the predicted data from the output of adder 905 and then applies the intra prediction computed by intra prediction block 815 of the encoding process 800. Addition unit 905 recovers the predicted frame. As previously discussed in conjunction with encoding, it is possible to transmit an unpredicted or I frame. If the data stream signals that a received frame is an I frame, then the predicted frame supplied to addition unit 905 is all 0's.

The output of addition unit 905 supplies the input of deblock filter 910. Deblock filter 910 smoothes artifacts created by the block and macroblock nature of the encoding process. The result is reconstructed frame $F'_n$ 911. As shown schematically in FIG. 9, this reconstructed frame $F'_n$ 911 becomes the next reference frame $F_{n-1}$ 906.

The deblocking filtering of deblock filter 823 and deblock 910 must be the same. This enables the decoding process to accurately reflect the input frame $F_n$ 801 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

This invention is based upon the following observations are made for 8 directional prediction types (except DC). Calculation of each predictor pixel in the prediction buffer involves a dot product of a set of neighbor pixels with some constants. The neighbors used for calculation of a given prediction value are 4 or fewer adjacent pixels, with neighbor pixels placed as a continuous set in order of left to top right neighbors as LKJIMABCDEFGH. All pixels for the prediction buffer (except DC prediction) can be calculated using following formula:

$$pred=(n0*k0+n1*k1+n2*k2+n3*k3+2)/4 \quad (5)$$

where: n0 to n3 are neighbor pixels A to M having 8-bit unsigned values; k0 to k3 are 8-bit unsigned constant values; and pred is the calculated predictor value which is an 8-bit unsigned value.

Figure 10:
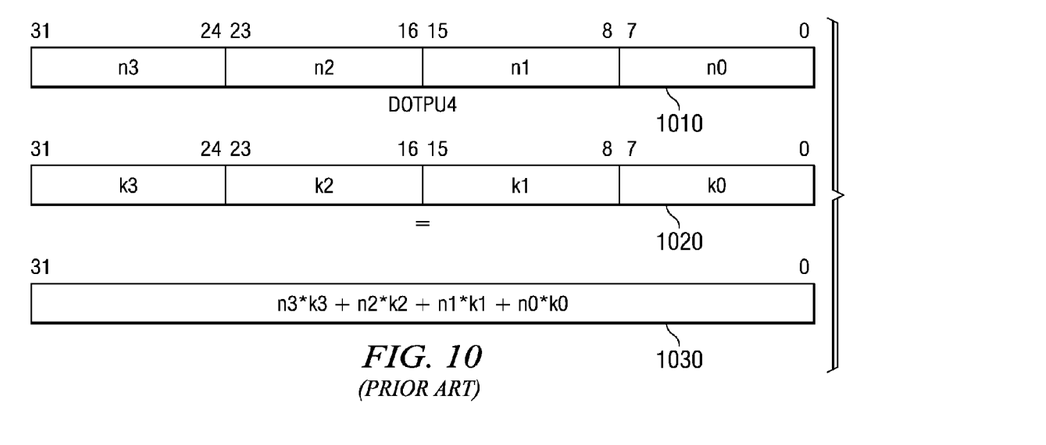
FIG. 10 illustrates the data processing of a prior art dot product instruction upon 8-bit data packed into 32-bit data words.

This formula can be implemented using SIMD dot product DOTPU4 on a Texas Instruments TMS320C6400 digital signal processor followed by an add and shift by 2. FIG. 10 illustrates the data processing preformed by this DOTPU4 instruction. In this example 32-bit data word 410 includes pixel values n0 to n3 packed as n3n2n1n0 and 32-bit data word 420 includes the constants k0 to k3 packed as k3k2k1k0. The result of the DOTPU4 instruction is the quantity n3*k3+n2*k2+n1*k1+n0*k0. Equation 5 is completed by adding 2 to the result of the DOTPU4 instruction and right shifting by 2 bits to perform the division by 4. This process is designated as follows:

$$pred=(dotpu4(n3210,k3210)+2)>>2 \quad (6)$$

This invention includes creation of a neighbor table ngbr_tbl[0:5]. Table 3 illustrates the data of such a table using the convention of FIG. 1.

TABLE 3

| ngbr_tbl_index | Packed Neighbor Pixels |
|---|---|
| 0 | DCBA |
| 1 | HGFE |
| 2 | LKJI |
| 3 | DCFE |
| 4 | IBAM |
| 5 | KJIM |

As shown in Table 3, the entry at each index is four 8-bit pixels packed into a 32-bit data word. These entries supply the data n3n2n1n0 of equation 6. The table is preferably stored in a scratch memory area independent of the prediction mode. Some of the entries in the ngbr_tbl table are available directly from neighbor pixels. For example DCBA is the top ngbr array shown in Table 3. Some of entries must be created by packing of neighbor pixel values as appropriate.

This invention also creates a static two dimensional prediction table pred_tbl. Table 4 shows the data in this pred_tbl.

TABLE 4

| Prediction Table Index | Coefficients (k3k2k1k0) for Dot Product | Index values into Neighbor Table |
|---|---|---|
| 0 Vertical | 0x00000004, 0x00000400, 0x00040000, 0x04000000, 0x00000004, 0x00000400, 0x00040000, 0x04000000, 0x00000004, 0x00000400, 0x00040000, 0x04000000, 0x00000004, 0x00000400, 0x00040000, 0x04000000 | 0x00000000, 0x00000000 |
| 1 Horizontal | 0x00000004, 0x00000004, 0x00000004, 0x00000004, 0x00000400, 0x00000400, 0x00000400, 0x00000400, 0x00040000, 0x00040000, 0x00040000, 0x00040000, 0x04000000, 0x04000000, 0x04000000, 0x04000000 | 0x22222222, 0x22222222 |

TABLE 4-continued

| Prediction Table Index | Coefficients (k3k2k1k0) for Dot Product | Index values into Neighbor Table |
|---|---|---|
| 2 DC (dummy entries) | 0x00000004, 0x00000004, 0x00000004, 0x00000004, 0x00000004, 0x00000004, 0x00000004, 0x00000004, 0x00000004, 0x00000004, 0x00000004, 0x00000004, 0x00000004, 0x00000004, 0x00000004, 0x00000004 | 0x00000000, 0x00000000 |
| 3 Diagonal down-left | 0x00010201, 0x01020100, 0x02010001, 0x01000102, 0x01020100, 0x02010001, 0x01000102, 0x00010201, 0x02010001, 0x01000102, 0x00010201, 0x01020100, 0x01000102, 0x00010201, 0x01020100, 0x03010000 | 0x00330331, 0x33113111 |
| 4 Diagonal down-right | 0x01000102, 0x00010201, 0x00010201, 0x01020100, 0x00010201, 0x01000102, 0x00010201, 0x00010201, 0x00010201, 0x00010201, 0x01000102, 0x00010201, 0x01020100, 0x00010201, 0x00010201, 0x01000102 | 0x44005440, 0x25442254 |
| 5 Vertical-right | 0x00000202, 0x00000202, 0x00020200, 0x02020000, 0x01000102, 0x00010201, 0x00010201, 0x01020100, 0x00010201, 0x00000202, 0x00000202, 0x00020200, 0x00010201, 0x01000102, 0x00010201, 0x00010201 | 0x40004400, 0x54002440 |
| 6 Horizontal-down | 0x02000002, 0x01000102, 0x00010201, 0x00010201, 0x00000202, 0x00010201, 0x02000002, 0x01000102, 0x00020200, 0x00010201, 0x00000202, 0x00010201, 0x02020000, 0x01020100, 0x00020200, 0x00010201 | 0x44402544, 0x22252222 |
| 7 Vertical-left | 0x00000202, 0x00020200, 0x02020000, 0x02000002, 0x00010201, 0x01020100, 0x02010001, 0x01000102, 0x00020200, 0x02020000, 0x02000002, 0x00000202, 0x01020100, 0x02010001, 0x01000102, 0x00010201 | 0x00030033, 0x00330331 |
| 8 Horizontal-up | 0x00000202, 0x00010201, 0x00020200, 0x01020100, 0x00020200, 0x01020100, 0x02020000, 0x03010000, 0x02020000, 0x03010000, 0x04000000, 0x04000000, 0x04000000, 0x04000000, 0x04000000, 0x04000000 | 0x22222222, 0x22222222 |

The prediction mode table of Table 4 is divided into two sections. The first section stores constants k3k2k1k0 of the predicted value calculation. The first index into this section of pred_tbl is from 0 to 8 selected by the prediction mode. This is shown in the first column of Table 4. The entry for a given prediction mode contains the following information for 16 pixels a to p (FIG. 1). Thus the particular pixel is the second dimension into this section of the prediction mode table. Each such entry includes four 8-bit constants k3k2k1k0 packed as a 32-bit word. This constant data is used in the DOTPU4 instruction as shown in equation 6. These are stored as first 16 word values in a given entry. The second section of the prediction mode table includes packed 4-bit indices into neighbor table ngbr_tbl. The particular 4-bit index is determined by the pixel position a to p. These indices point to the data used in dot product with the selected constants. As shown in Table 4, these indices select the data n3n2n1n0 used in equation 6 by selecting data from ngbr_tbl for a given predictor pixel. This information is 4 bits times 16 pixels or two 32-bit data words. This information is stored as last 2 words in a given entry. The entry for DC prediction mode (index 2) contains dummy data. As previously stated, DC prediction is handled separately as a special case. DC prediction requires checking availability of neighbor pixels and uses a different calculation than equation 6.

Figure 11:
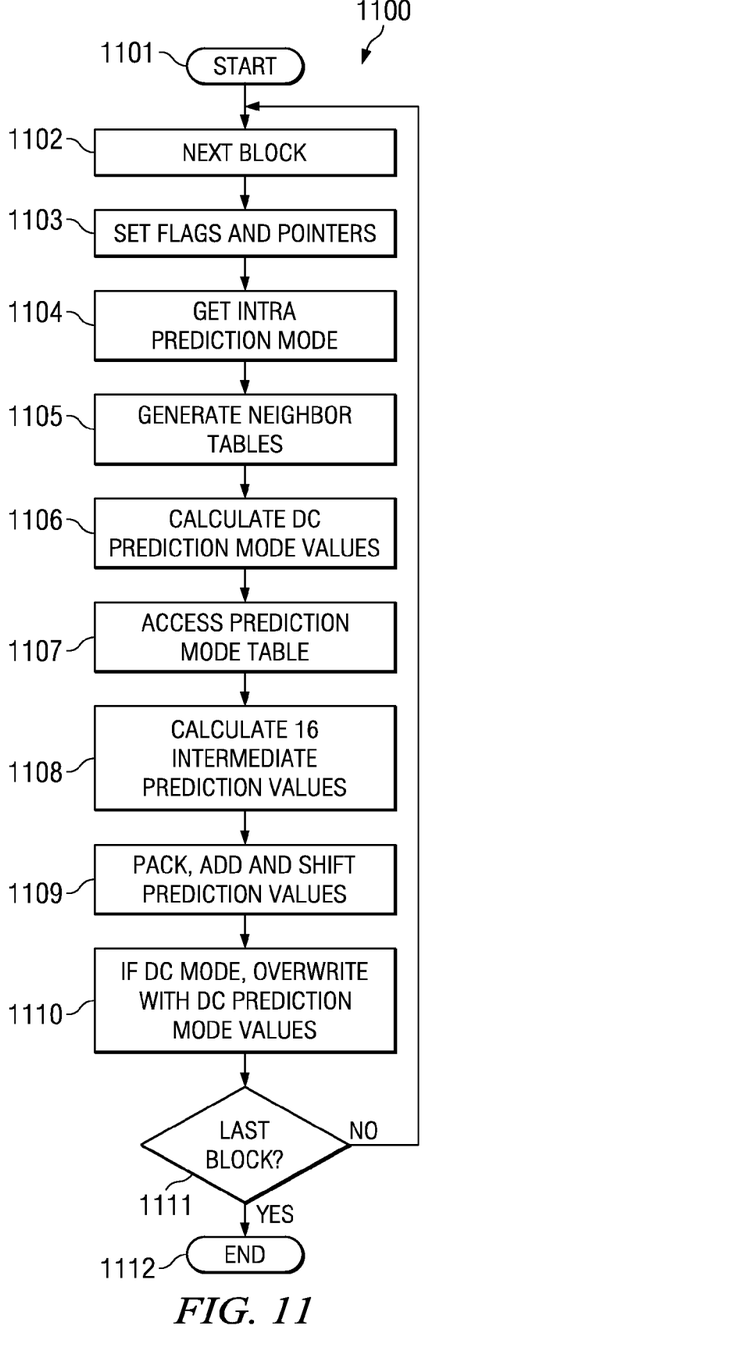
FIG. 11 illustrates the method of this invention in flowchart form.

FIG. 11 illustrates method 1100 of this application in flowchart form. Method begins with start block 1101. Method 1100 considers the next block in block 1102. The identity of this next block is selected based upon the scan order illustrated in FIG. 3. Method 1100 covers all sixteen pixels in a 4 by 4 block in one iteration.

Block 1103 sets flags and pointers. These flags and pointers include those noted in Table 1. The pixel data to be coded or the compressed data to be decoded is preferably stored in a known location and the known location of the current block enables calculation of these flags and pointers. Block 1104 reads the current intra prediction mode. In the case of decoding, this intra prediction mode must be transmitted together with the residual data. In the case of coding, this mode is determined in a manner known in the art. Determining the intra prediction mode generally includes an estimate of the mode yielding the best data compression.

Step 1105 generates the neighbor table ngbr_tbl as shown in Table 3. This process preferably uses the flags and pointers initialized in block 1103. In particular the pixels A to M are determined as follows:

$A = top\_ngbr[0];$ $B = top\_ngbr[1];$ $C = top\_ngbr[2];$ $D = top\_ngbr[3];$ $I = left\_ngbr[0];$ $J = left\_ngbr[1];$ $K = left\_ngbr[2];$ $L = left\_ngbr[3];$ and $M = corner\_nbr.$ (7)

The neighbor pixels E, F, G and H are determined as follows. If topright_avail indicates that the top right pixel is available, then:

$E = top\_ngbr[4];$ $F = top\_ngbr[5];$ $G = top\_ngbr[6];$ and $H = top\_ngbr[7].$ (8)

Otherwise, if topright_avail indicates the top right pixel is not available, then:

$E = F = G = H = D$ (9).

Once these pixel values are determined, then they are packed four into each data word as shown in Table 3.

Block 1106 calculates the DC prediction mode value. This process is described above. In general, this calculation involved checking the availability of top and left neighbor pixels. This calculation uses one of equations 1 to 4 depending on pixel availability as previously described. This calculation preferably is preformed as follows. If left neighbors I to L are available and top neighbors A to D are not, then the packed word DCBA is set to the packed word LKJI. If left neighbors I to L are not available and top neighbors A to D are, then the packed word LKJI is set to the packed word DCBA. DC prediction value is then calculated as follows. The dot product of DCBA and the constant 0x1010101 is added to the dot product of LKJI and the constant 0x01010101. This preferably uses the DOTPU4 instruction. Note the constant 0x01010101 makes each product equal to the other term. Thus each dot product is effectively the sum of the four packed pixel values. The constant 4 is then added to the sum of dot products. The resultant is right shifted three bits to divide by 8. This process performs equation 1. Note that following the copying of LKJI into DCBA, these steps perform equation 3. Following copying of DCBE into LKJI, these steps perform equation 2. Following this calculation, two copies of the resultant are packed into a 32-bit data word.

Block 1107 accesses data in the prediction mode table shown in Table 4. The first dimension index into the prediction mode table is the intra prediction mode. The second dimension index into the prediction mode table is the pixel position a to p. These indices into the prediction mode table yield a 32-bit word with four 8-bit packed constants k3k2k1k0 and a 4-bit word index into the neighbor table (Table 3). These specify the constants and data for the intra prediction calculation.

Block 1108 calculates intermediate intra prediction values for the 16 pixels a to p. As previously described, the intra prediction mode and pixel location enable recall of the constant k3k2k1k0 form the prediction mode table. The intra prediction mode and pixel location enable recall of a neighbor table pointer. This neighbor table pointer permits recall of the corresponding neighbor pixels from the neighbor table. The intermediate intra prediction value is the dot product of these quantities. Thus the intermediate value pr is calculated as:

$$pr = DOTPU4(k3k2k1k0, n3n2n1n0) \quad (10).$$

The result of the 8-bit by 8-bit multiplies are 16-bit products. The sum of these four products appears in the least significant bits of the 32-bit resultant data word. The following description assumes that the sum does not carry over to the 17th bit. These sixteen calculations are preferably performed as in-line code rather than as one or more loops. Note that for the DC mode the constant data stored in the prediction mode table is dummy data. The results of this and later calculations will be replaced later.

Block 1109 completes calculation of the intra mode prediction values. The sixteen dot products are packed into eight 32-bit data words via a PACK2 instruction. Next 2 is added to the sixteen dot products packed into eight 32-bit data words using an ADD2 instruction. This ADD2 instruction separately adds two 16-bit parts of a 32-bit data word. One operand of the ADD2 instruction is a corresponding packed intermediate value. The other operand is a constant 0x00020002 which places the constant 2 in both 16-bit halves of the 32-bit data word. A final division is accomplished by a right shift. This preferably uses a SHR2 command which separately right shifts the two 16-bit halves of the 32-bit data word. The results of these calculates are 16 intra prediction mode values packed into eight 32-bit data words.

Block 1110 overwrites the just calculated eight 32-bit prediction values if the prediction mode is the DC mode (mode 2). This is preferably accomplished using predicated register to register move instructions. Eight such register to register move instructions have the corresponding register storing the DC mode prediction values calculated in block 1106 as the source operand. The registers storing the corresponding just described intra prediction mode values are the destination operands. Each register to register move instruction is predicated upon the value in an instruction designated predicate register. A value indicating the mode is the DC mode, allows the register to register move. This causes the calculated DC mode values to be stored in the destination registers. A value indicating a mode other than the DC mode aborts the register to register move. This causes the previous values calculated as described above to remain in the destination registers. This speculative calculation and conditional overwrite technique is used to avoid a conditional branch to the much different manner of calculating the DC mode prediction value. During decoding, the resultant intra mode prediction data can be added to the residual error data to produce the output pixels.

Test block 1111 determines if the current block is the last block in the current macroblock. If not (No at test block 1111), then method 1100 returns to block 1102 to perform the prediction value calculations for the next block. If the current block was the last block in the current macroblock (Yes at test block 1111), then method 1100 ends with end block 1112. A practical implementation will include outer loops for other macroblocks and other processes in the video processing.

Table 5 shows a comparison of this invention used in decoding with the conventional approach. Table 5 shows a comparison of the cycle count for decoding of a macroblock on a Texas Instruments TMS320C6400 digital signal processor as measured on a cycle accurate simulator. Table 5 lists a comparison for each prediction mode and for an average case. The comparison Table 5 assumes for numbers 1 to 9 that all sixteen 4 by 4 blocks of a particular macroblock have the same prediction mode. In a real-time decoder, different blocks in a macroblock may have different prediction modes. Number 10 showing the average case assumes that the blocks in a macroblock may have different prediction modes. Table 5 shows an improvement in range of 30 to 40% with and average improvement of about 35%.

TABLE 5

| Serial Number | Prediction Mode | Cycle Count for 16 by 16 | | % Improvement |
|---|---|---|---|---|
| | | Prior Art | Invention | |
| 1 | 0 Vertical | 776 | 521 | 32.86 |
| 2 | 1 Horizontal | 760 | 521 | 31.45 |
| 3 | 2 DC | 904 | 521 | 42.37 |
| 4 | 3 Diagonal down-left | 880 | 521 | 40.8 |
| 5 | 4 Diagonal down-right | 888 | 521 | 41.33 |
| 6 | 5 Vertical-right | 880 | 521 | 40.8 |
| 7 | 6 Horizontal-down | 888 | 521 | 41.33 |
| 8 | 7 Vertical-left | 864 | 521 | 39.7 |
| 9 | 8 Horizontal-up | 856 | 521 | 39.14 |
| 10 | Average case | 807 | 521 | 35.44 |

This invention is a novel approach for intra prediction mode encoding and decoding on a pipelined VLIW processor. This invention uses table creation and lookup. This invention handles the 9 prediction modes within a macroblock without any conditional branches in the code. This enables optimal utilization of a pipelined VLIW processor through software pipelining. The improvement of this invention is in range of 30 to 40% for a H.264 decoder on a Texas Instruments TMS320C6400 data signal processor.

What is claimed is:

1. A method of calculating intra prediction values in video encoding and decoding for pixels in a block for a selected intra prediction mode comprising the steps of:
    constructing a table storing constant data independent of pixel data related to calculation of an intra prediction value for a first dimension set by said selected intra prediction mode and a second dimension selected by a current pixel;
    for each pixel in the block of pixels
        recalling constant data corresponding to the current pixel and the selected intra prediction mode,
        recalling other pixel data corresponding to the current pixel and the selected intra prediction mode, and
        arithmetically combining said recalled constant data and said recalled other pixel data to form an intra prediction value for the selected intra prediction mode including
            multiplying each other pixel data by corresponding constant data thereby forming plural products,
            adding said plural products thereby forming a sum, and
            scaling said sum by adding a predetermined constant to said sum thereby forming a further sum, and right shifting said further sum a predetermined number of bits.

2. The method of claim 1, wherein:
said step of constructing a table includes generating multiple fixed length constants packed into predetermined portions of a single data word.

3. The method of claim 2, wherein:
each of said fixed length constants is 8 bits; and
said single data word is 32bits.

4. The method of claim 1, wherein:
said step of constructing a table further includes
    storing pointer data for a first dimension set by said selected intra prediction mode and a second dimension selected by a current pixel, and
    storing other pixel data for a first dimension corresponding to pointer data;
constructing a table storing other pixel data at plural pointer locations;
said step of recalling other pixel data includes
    recalling pointer data corresponding to the current pixel and the selected intra prediction mode, and
    recalling other pixel data corresponding to the recalled pointer data.

5. The method of claim 4, wherein:
said step of constructing a table includes generating multiple fixed length pointer data packed into predetermined portions of a single data word.

6. The method of claim 5, wherein:
each of said pointer is 4 bits; and
said single data word is 32 bits.

7. The method of claim 4, wherein:
said step of constructing a table storing other pixel data includes generating multiple fixed length constants packed into predetermined portions of a single data word.

8. The method of claim 7, wherein:
each of said other pixel data is 8 bits; and
said single data word is 32 bits.

9. The method of claim 1, wherein:
said step of constructing a table includes generating multiple fixed length constants packed into predetermined portions of a single data word;
said step of recalling other pixel data includes recalling multiple fixed length other pixel data of said fixed length packed into a single data word; and
said step of multiplying each other pixel data by corresponding constant data and adding said plural products includes performing a multiple dot product instruction on a digital signal processor.

10. The method of claim 1, wherein:
said step of constructing a table includes generating multiple fixed length constants packed into predetermined portions of a single data word;
said step of recalling other pixel data includes recalling multiple fixed length other pixel data of said fixed length packed into a single data word;
said method further comprises storing multiple instances of said sum into a single data word; and
wherein said step of adding a predetermined constant to said sum includes performing a multiple add instruction on a digital signal processor.

11. The method of claim 10, wherein:
said step of right shifting said further sum a predetermined number of bits includes performing a multiple shift instruction on a digital signal processor.

12. The method of claim 1, wherein:
said step of arithmetically combining said recalled constant data and said recalled other pixel data to form an intra prediction value for the selected intra prediction mode employs the same arithmetic combination for each intra prediction mode except for a DC intra prediction mode;
the method further comprising:
separately calculating an intra prediction value for each pixel of the block for said DC intra prediction mode;
following arithmetically combining said recalled constant data and said recalled other pixel data
    determining if the intra prediction mode is said DC intra prediction mode, and
    overwriting said arithmetic combination of said recalled constant data and said recalled other pixel data with said separately calculated intra prediction value for said DC intra prediction mode for each pixel if the intra prediction mode is said DC intra prediction mode.

* * * * *